(12) United States Patent
Yamamiya (10) Patent No.: US 12,365,537 B2
(45) Date of Patent: Jul. 22, 2025

(54) CARD HANDLING APPARATUS

(71) Applicant: Asahi Seiko Co., Ltd, Tokyo (JP)

(72) Inventor: Takahito Yamamiya, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 345 days.

(21) Appl. No.: 18/096,118

(22) Filed: Jan. 12, 2023

(65) Prior Publication Data
US 2023/0227254 A1 Jul. 20, 2023

(30) Foreign Application Priority Data
Jan. 14, 2022 (JP) .................. 2022-004266

(51) Int. Cl.
| | |
|---|---|
| B65G 1/04 | (2006.01) |
| B65H 1/06 | (2006.01) |
| B65H 1/10 | (2006.01) |
| B65H 3/06 | (2006.01) |
| B65H 7/02 | (2006.01) |

(52) U.S. Cl.
CPC .............. *B65G 1/04* (2013.01); *B65H 1/06* (2013.01); *B65H 1/10* (2013.01); *B65H 3/063* (2013.01); *B65H 7/02* (2013.01)

(58) Field of Classification Search
CPC .................................. B65H 3/063; B65H 7/02
See application file for complete search history.

(56) References Cited

U.S. PATENT DOCUMENTS

| | | | |
|---|---|---|---|
| 6,345,727 B1 * | 2/2002 | Kazou | .................. G06K 13/14 |
| | | | 221/145 |
| 6,602,043 B2 | 8/2003 | Honda | |
| 10,093,475 B2 | 10/2018 | Massey et al. | |
| 10,521,620 B2 * | 12/2019 | Willis | .................. G06K 13/08 |
| 10,954,061 B2 | 3/2021 | Massey et al. | |
| 2017/0193253 A1 | 7/2017 | Willis | |
| 2020/0247637 A1 | 8/2020 | Hoffmal et al. | |

FOREIGN PATENT DOCUMENTS

| | | |
|---|---|---|
| EP | 0 961 219 | 12/1999 |
| JP | 7-31737 | 6/1995 |
| JP | 2001-331853 | 11/2001 |
| JP | 6287913 | 3/2018 |

OTHER PUBLICATIONS

Extended European Search Report issued in EP Application No. 22216366.9, dated May 30, 2023.

* cited by examiner

*Primary Examiner* — Gene O Crawford
*Assistant Examiner* — Ayodeji T Ojofeitimi
(74) *Attorney, Agent, or Firm* — GREENBLUM & BERNSTEIN, P.L.C.

(57) ABSTRACT

In order to increase a stored amount of cards in a card handling apparatus that discharges cards stored in the card cassettes one by one, the card handling apparatus is provided with two card cassettes. A first card cassette and a second card cassette are arranged along a conveying path for the card, and when all cards stored in the first card cassette is discharged, the card is discharged from the second card cassette. The first card cassette has a gate for allowing the card discharged from the second card cassette to enter on a back surface. The card discharged from the second card cassette enters the first card cassette from the gate, passing the inside and being discharged from a discharge port of the first card cassette.

7 Claims, 12 Drawing Sheets

FIG.12

CARD HANDLING APPARATUS

BACKGROUND OF THE INVENTION

1. Field of the Invention

The present invention relates to a card handling apparatus dispensing cards from a card cassette.

2. Description of Related Art

There is known a card handling apparatus having a card cassette device housing a plurality of cards in a stacked state thereinside, in which the cards inside the card cassette device are dispensed one by one from a card exit. For example, a card dispenser described in JP6287913B is known as a card handling apparatus.

The card cassette device mounted on the card dispenser is attachable/detachable to/from the card dispenser. When restocking cards in the card cassette device, the card cassette device is detached from the card dispenser. Cards housed in the card cassette device may have a high monetary value. Therefore, there is a risk that cards are stolen or lost at the time of the above work, at the time of storing the cassette device, or at the time of using the cassette device. Accordingly, the card cassette device is provided with a mechanism for preventing unauthorized access to the cards housed inside the device by positively blocking the card exit both in a state of being attached to the card dispenser and in a state of being detached from the dispenser.

One card cassette device is attached to the related-art card handling apparatus. Meanwhile, there is a demand to reduce the frequency of restocking cards from a user, and it is desired to provide an apparatus capable of housing as many cards as possible at a time.

A structure in which a housing part in the card cassette device is made tall can be considered for increasing the number of cards to be housed; however, a high load is put on a card at the lowest position in the state where many cards are stacked. In the case where the high load is imposed on the card at the lowest position, the card handling apparatus may not be able to separate the card at the lowest position one by one to convey the card. There is also a problem that the card cassette device is increased in size to make conveyance and attachment/detachment of the device inconvenient when the card cassette device is made tall.

SUMMARY OF THE INVENTION

A card handling apparatus according to the present invention includes a card cassette that houses cards and a conveying device that separates one card at the lowest position from the cards housed in the card cassette and convey the card, which conveys the cards one by one, in which the card cassette has a first card cassette and a second card cassette, and the first card cassette is disposed on the downstream side of the second card cassette in a conveying direction of the cards, the first card cassette has a card entrance from which the card is put into the first card cassette on an upstream side in the conveying direction and a card exit from which the card is dispensed from the inside of the first card cassette on a downstream side in the conveying direction, the second card cassette has a card exit from which the card is dispensed from the inside of the second card cassette on the downstream side in the conveying direction, when the first card cassette houses the cards, the conveying device separates one card at the lowest position from the cards housed in the first card cassette and dispenses the card from the card exit of the first card cassette, and, when the first card cassette houses no card, the conveying device separates one card at the lowest position from the cards housed in the second card cassette, dispensing the card from the card exit of the second card cassette and putting the card into the first card cassette from the card entrance of the first card cassette to allow the card to pass inside the first card cassette and to be dispensed from the card exit of the first card cassette.

When adopting the card handling apparatus according to the present invention, many cards can be housed, and the card at the lowest position in the loaded cards can be separated one by one and conveyed. Moreover, when adopting the card handling apparatus according to the present invention, it is possible to maintain a security feature of the card cassette and to prevent the cards housed in the card cassette from being lost or stolen.

DETAILED DESCRIPTION OF THE INVENTION

Hereinafter, an embodiment of the present invention will be explained in detail with reference to the drawings. Respective drawings are merely schematically shown to a degree that the invention can be sufficiently understood. Therefore, the present invention is not exclusively limited to shown examples. In respective drawings, same symbols are given to common components and similar components, and repeated explanation thereof is omitted. A card handling apparatus will be explained with reference to FIG. 1 to FIG. 12.

Figure 1:
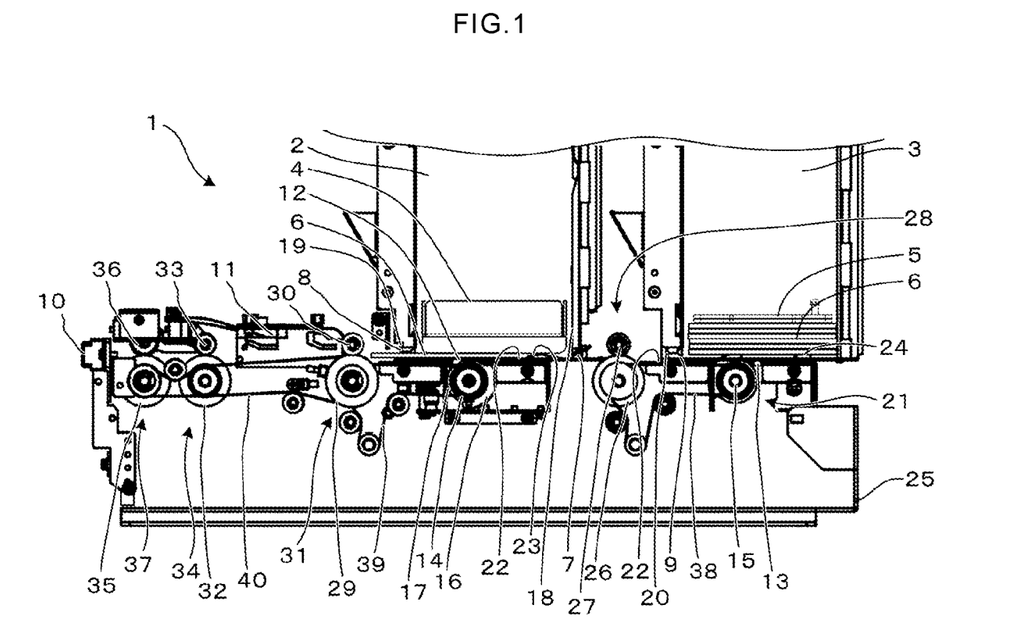
FIG. 1 is a side view for explaining conveyance of cards in a card handling apparatus.

FIG. 1 is a view for explaining conveyance of cards in the card handling apparatus. A card handling apparatus 1 is provided with a conveying device 21 that conveys cards. A card reader/writer unit 11 is disposed in the middle of a conveying path for cards in the card handling apparatus 1. Cards 6 are housed in a first card cassette 2 and a second card cassette 3. The first card cassette 2 and the second card cassette 3 can be attached/detached to/from the conveying device 21. FIG. 1 shows a state where the first card cassette 2 in which no card is housed is attached to the conveying device 21 and the second card cassette 3 in which cards 6 are housed is attached to the conveying device 21. At an end part of the conveying device 21, a card entrance/exit 10 that is a gate for cards is arranged. The conveying device 21 is fixed to a frame 25.

The first card cassette 2 has a space for housing the cards thereinside in a stacked state, and a first weight 4 to be placed on the card at the highest position in the stacked cards is housed thereinside. An opening is provided at a portion corresponding to a first separation roller 14 on a bottom surface of the first card cassette 2. A back side of the card 6 and the first separation roller 14 can contact each other through the opening. A bottom surface on the inside of the first card cassette 2 doubles as a conveying surface 22 on which the cards 6 are conveyed. A first protrusion 23 is disposed on the bottom surface on the inside of the first card cassette 2 so that a clearance is formed between the placed card and the bottom surface on the inside of the first card cassette 2. The first protrusion 23 prevents the card 6 from sticking to the conveying surface 22; however, the first protrusion 23 is not always necessary. It is sufficient that the conveying device 21 can convey the card 6 even when the first protrusion 23 is not disposed on the conveying surface 22. The first protrusion 23 is preferably as low as possible in height because the conveyance of the card 6 is adversely affected when a protruding amount from the conveying surface 22 is large. The first protrusion 23 is set to, for example, a height equal to or less than five cards 6 to be used, or 5 mm or less. Further preferably, the first protrusion 23 is set to, for example, 1 mm or less, or set to be lower than a height of one card 6. It is further preferable that the first protrusion 23 becomes high from the conveying surface 22 steplessly in a conveying direction so that the card 6 is not caught. As there is a case where the card 6 is warped, the first protrusion 23 can be ineffective when the first protrusion 23 is too low. The first protrusion 23 is preferably has a height of 0.1 mm or more. It can be considered, as another example, that minute roughness is arranged on the surface of the card 6 to reduce a contact area between the cards 6 or between the card 6 and the conveying surface 22, thereby conveying the cards 6 smoothly.

An entrance 7 of the first card cassette 2 is provided on an upstream side of the first card cassette 2 in the conveying direction of the cards 6, and an exit 8 of the first card cassette 2 is provided on the downstream side. The entrance 7 of the first card cassette 2 is a card entrance of the first card cassette 2 and the exit 8 of the first card cassette 2 is a card exit of the first card cassette 2. The first card cassette 2 is also provided with a first gate 18 for opening/closing the entrance 7 of the first card cassette 2 and a second gate 19 for opening/closing the exit 8 of the first card cassette 2. The first gate 18 is disposed so as to move vertically. When the card is conveyed, the first gate 18 and the second gate 19 are opened. An end portion of the first gate 18 has a slope inclined to the end from the outside to the inside of the first card cassette 2. When the card 6 is conveyed from the outside to the inside of the first card cassette 2, the card 6 abuts on the inclined portion at the end of the first gate 18 and pushes up the first gate 18 to enter the inside of the first card cassette 2. When the first gate 18 is unlocked, the first gate 18 is pushed up by the card 6, and the card 6 is conveyed to the inside of the first card cassette 2. When the first gate 18 is locked, the first gate 18 is not pushed up by the card 6, and the card 6 is not conveyed to the inside of the first card cassette 2.

The conveying device 21 is provided with a first card detection sensor 12 detecting whether the card is housed inside the first card cassette 2 or not, and an opening is formed on the bottom surface of the first card cassette 2 at a portion corresponding to the first card detection sensor 12. The first card detection sensor 12 detects the presence of the card through the opening on the bottom surface of the first card cassette 2. The first card detection sensor 12 is arranged on a downstream side of the first separation roller 14 in the conveying direction of the card 6. The first card detection sensor 12 detects whether the card 6 is housed inside the first card cassette 2 or not and detects that the card 6 is placed at a position where the card 6 can be conveyed by the first separation roller 14.

The first separation roller 14 includes a drive area 16 having a long distance from the rotation center to a circumferential surface and a non-drive area 17 having a short distance. The drive area 16 of the first separation roller 14 can contact the card inside the first card cassette 2, and the non-drive area 17 of the first separation roller 14 does not contact the card inside the first card cassette 2. A second separation roller 15 also includes the drive area 16 and the non-drive area 17 in the same manner as the first separation roller 14. The first separation roller 14 is selectively controlled into a drive state or an idling state. A not-shown clutch is provided between the first separation roller 14 and a drive motor thereof. In the clutch, the transmission of driving force is turned on/off by a drive device such as a solenoid. The transmission of driving force is turned on/off also in the second separation roller 15.

When the first separation roller 14 is turned, the card at the lowest position of the first card cassette 2 is conveyed to the exit 8 of the first card cassette 2. When the second separation roller 15 is turned, the card at the lowest position of the second card cassette 3 is conveyed to an exit 9 of the second card cassette 3. In openings of the exit 8 of the first card cassette 2 and the exit 9 of the second card cassette 3, heights from the conveying surface 22 are set so that one card can pass through the opening and two stacked cards are not allowed to pass through the opening. For example, when a thickness of the card is 1.0 mm, the height of the opening is set to 1.2 mm to 1.8 mm. A clearance of 20 to 80% of the thickness of the card to be used is arranged at the opening. When the card at the lowest position is conveyed to the outside of the first card cassette 2, the second card from the bottom remains inside the first card cassette 2.

When the first card cassette 2 does not house any card, the card 6 is conveyed from the second card cassette 3 and the card 6 is introduced into the first card cassette 2 in a state where the first separation roller 14 is turned. At an end of the first weight 4, an abutting surface with respect to the card 6 is inclined so as to be close to the conveying surface 22 toward the conveying direction, and the card 6 is conveyed so as to pass under the first weight 4 along the slope at the end of the first weight 4. The card 6 entering the inside the first card cassette 2 from the second card cassette 3 is conveyed between the first weight 4 and the conveying surface 22. The first weight 4 has approximately the same size as the card 6 when seen from an upper surface so as not to move or rotate freely in a horizontal direction inside the first card cassette 2. A later-described second weight 5 also has approximately the same size as the card 6 when seen from the upper surface so as to restrict the movement in the horizontal direction inside the second card cassette 3.

The second card cassette 3 has a space for housing the cards thereinside in the stacked state, and the second weight 5 to be placed on the card at the highest position in the stacked cards is housed thereinside. A plurality of cards 6 are housed in the second card cassette 3 in the stacked state, and the second weight 5 is placed thereon. An opening is provided at a portion corresponding to the second separation roller 15 on a bottom surface on the inside of the second card cassette 3. The back side of the card 6 and the second separation roller 15 can contact each other through the opening. The bottom surface on the inside of the second card cassette 3 doubles as the conveying surface 22 on which the cards 6 are conveyed. A second protrusion 24 is disposed on the bottom surface on the inside of the second card cassette 3 so that a clearance is formed between the placed card 6 and the bottom surface on the inside of the second card cassette 3. The second protrusion 24 may have the same shape as the first protrusion 23 explained above. The conveying device 21 is provided with a second card detection sensor 13 detecting whether the card 6 is housed inside the second card cassette 3 or not. An opening is formed on the bottom surface of the second card cassette 3 at a portion corresponding to the second card detection sensor 13. The second card detection sensor 13 detects the presence of the card 6 in the second card cassette 3 through the opening on the bottom surface of the second card cassette 3.

An upstream side of the second card cassette 3 in the conveying direction of the card 6 has no opening and is closed. The exit 9 of the second card cassette 3 is provided on a downstream side of the second card cassette 3 in the conveying direction of the card 6. The exit 9 of the second card cassette 3 is a card exit of the second card cassette 3. The second card cassette 3 is also provided with a third gate 20 for opening/closing the exit 9 of the second card cassette 3. The second card cassette 3 has a lock mechanism, and the lock mechanism can fix the third gate 20 in a closed state or an opened state. The lock mechanism of the second card cassette 3 may have the same structure as the lock mechanism for operating the second gate 19 of the first card cassette 2.

The conveying device 21 is provided with the second separation roller 15 that separates one card at the lowest position from cards housed in the second card cassette 3 and conveys the card. The conveying device 21 is also provided with a first conveying roller pair 28 that conveys the card 6 from the second card cassette 3 to the first card cassette 2. The conveying device 21 is further provided with the first separation roller 14 separating one card at the lowest position from cards housed in the first card cassette 2 and conveys the card, or conveys the card delivered from the second card cassette 3. Moreover, the conveying device 21 is provided with a second conveying roller pair 31 that conveys the card 6 sent from the first card cassette 2 to the card reader/writer unit 11. The conveying device 21 is provided with a third conveying roller pair 34, and a fourth conveying roller pair 37 between the card entrance/exit 10 and the card reader/writer unit 11. The card is conveyed by these rollers. The conveying device 21 conveys the card 6 by a plurality of rollers arranged at intervals shorter than a length of the card 6.

The first conveying roller pair 28 has a first drive roller 26 and a first driven roller 27. The first driven roller 27 is biased to a direction of the first drive roller 26 and the rollers rotate together. The card 6 is held between the first drive roller 26 and the first driven roller 27 and conveyed. The first drive roller 26 and the second separation roller 15 are connected to a first drive belt 38 and rollers work in conjunction with each other. A protruding amount of the first drive roller 26 from the conveying surface 22 is preferably larger than a protruding amount of the first protrusion 23 from the conveying surface 22. If the protruding amount of the first protrusion 23 is made large, a tip end of the card to be conveyed easily rises up and a problem occurs in contact between the first separation roller 14 and the card.

The second conveying roller pair 31 has a second drive roller 29 and a second driven roller 30. The second driven roller 30 is biased to a direction of the second drive roller 29 and the rollers rotate together. The card 6 is held between the second drive roller 29 and the second driven roller 30 and conveyed. The third conveying roller pair 34 includes a third drive roller 32 and a third driven roller 33. The third driven roller 33 is biased to a direction of the third drive roller 32 and the rollers rotate together. The card 6 is held between the third drive roller 32 and the third driven roller 33 and conveyed. The fourth conveying roller pair 37 includes a fourth drive roller 35 and a fourth driven roller 36. The fourth driven roller 36 is biased to a direction of the fourth drive roller 35 and the rollers rotate together. The card 6 is held between the fourth drive roller 35 and the fourth driven roller 36 and conveyed. The second drive roller 29, the third drive roller 32, and the fourth drive roller 35 are connected to a fourth drive belt 40 and rollers work in conjunction with one another. The first separation roller 14 is connected to a second drive belt 39 to be driven.

The above conveying rollers are driven by a not-shown motor and are controlled by a not-shown control circuit together with the detection sensors and the card reader/writer unit.

Next, conveyance of the card will be explained. When the card is housed in the first card cassette 2, the card is supplied from the first card cassette 2 and dispensed from the card entrance/exit 10. When the card is not housed in the first card cassette 2, and the card is housed in the second card cassette 3, the card is supplied from the second card cassette 3. In this case, the first card cassette 2 forms part of the conveying path for the card. The card supplied from the second card cassette 3 passes the inside of the first card cassette 2 and dispensed from the card entrance/exit 10.

First, the conveyance of the card in the case where the card is housed in the first card cassette 2 will be explained.

Whether the card is housed in the first card cassette 2 or not is detected by the first card detection sensor 12. When the card is housed, the card is conveyed from the first card cassette 2. The first separation roller 14 is driven for that purpose. The card at the lowest position in the first card cassette 2 contacts the drive area of the first separation roller 14 and moves in the direction of the exit 8 of the first card cassette 2. In a case where the first weight 4 is not provided and the number of cards housed in the first card cassette 2 is small, friction force between the card and the first separation roller 14 becomes small; therefore, conveyance failure of the card occurs. In order to prevent conveyance failure of the card, a load is put on the card by the first weight 4. When the card 6 is conveyed by the first separation roller 14, the first weight 4 pushes the card 6 to the direction of the conveying surface 22 to prevent the first separation roller 14 from running idle or to prevent the tip end of the card 6 from rising up to a position higher than an upper edge of the exit 8 of the first card cassette 2. The second weight 5 pushes the card 6 to the direction of the conveying surface 22 to prevent the second separation roller 15 from running idle or to prevent the tip end of the card 6 from rising up to a position higher than an upper edge of the exit 9 of the second card cassette 3.

Driving of the second conveying roller pair 31, the third conveying roller pair 34, and the fourth conveying roller pair 37 are started with the driving of the first separation roller 14.

A distance between the first separation roller 14 and the second conveying roller pair 31 is shorter than the length of the card. The card sent from the exit 8 of the first card cassette 2 is held between the second conveying roller pair 31 and conveyed. A plurality of not-shown sensors are arranged in the conveying path for the card, and the position of the card to be conveyed can be specified by a not-shown control circuit.

When it is determined that the card is conveyed by the second conveying roller pair 31 and the card is sent from the first card cassette 2, the first separation roller 14 is stopped. For example, the transmission of driving force is disconnected by the clutch driven by the solenoid.

A distance between the second conveying roller pair 31 and the third conveying roller pair 34 is shorter than the length of the card. A distance between the third conveying roller pair 34 and the fourth conveying roller pair 37 is also shorter than the length of the card. The card is delivered from the second conveying roller pair 31 to the third conveying roller pair 34, delivered from the third conveying roller pair 34 to the fourth conveying roller pair 37, and dispensed from the card entrance/exit 10.

Next, the conveyance of the card in the case where the card is not housed in the first card cassette 2 and the card is housed in the second card cassette 3 will be explained.

When it is determined that the card is not housed in the first card cassette 2 by the first card detection sensor 12, whether the card is housed in the second card cassette 3 or not is detected by the second card detection sensor 13. When the card is housed, the second separation roller 15 is driven. The card at the lowest position in the second card cassette 3 contacts the drive area of the second separation roller 15 and moves to the direction of the exit 9 of the second card cassette 3. The second weight 5 puts a load on the card housed in the second card cassette 3 to maintain friction force with respect to the second separation roller 15, thereby preventing the conveyance failure of the card.

Driving of the first conveying roller pair 28, the first separation roller 14, the second conveying roller pair 31, the third conveying roller pair 34, and the fourth conveying roller pair 37 are started with the driving of the second separation roller 15.

A distance between the second separation roller 15 and the first conveying roller pair 28 is shorter than the length of the card. The card sent from the exit 9 of the second card cassette 3 is held between the first conveying roller pair 28 and conveyed.

When it is determined that the card is conveyed by the first conveying roller pair 28 and the card is sent from the second card cassette 3, the driving force to the second separation roller 15 is disconnected by the clutch.

A distance between the first conveying roller pair 28 and the first separation roller 14 is shorter than the length of the card. A distance between the first conveying roller pair 28 and the first card detection sensor 12 is shorter than the length of the card. The card is conveyed between the conveying surface 22 and the first weight 4. When the card is detected by the first card detection sensor 12, it is found that the card is placed at a position where the card is conveyed by the first separation roller 14. Conveyance of the card after that is the same as in the case where the card is housed in the first card cassette 2.

When data is read/written with respect to the card by the card reader/writer unit 11, the card reader/writer unit 11 reads/writes data with respect to the card while the card is conveyed by the second conveying roller pair 31 and the third conveying roller pair 34. When the card is a magnetic card, data is read/written by a magnetic head with respect to the card which is conveyed at a fixed speed. When the card is a contact-type IC card, conveyance by the second conveying roller pair 31 and the third conveying roller pair 34 is temporarily stopped and a contact element is allowed to contact a contact terminal of the card to thereby reading/writing data with respect to the card. When the card is a non-contact type IC card, conveyance by the second conveying roller pair 31 and the third conveying roller pair 34 is temporarily stopped and data is read/written by wireless.

When the card 6 is sent from the second card cassette 3 after all cards 6 originally housed are dispensed from the first card cassette 2, the card is conveyed through the inside of the first card cassette 2. Therefore, it takes time until the card reaches the card entrance/exit 10. Accordingly, one card 6 is conveyed from the second card cassette 3 to the first card cassette 2 and temporarily housed. When the card 6 is dispensed to the outside of the apparatus, the same processing as in the case where the card 6 is housed in the first card cassette 2 is executed in the card handling apparatus 1. It is possible to shorten time for dispensing the card 6 from the card handling apparatus 1. The card handling apparatus 1 supplies one card 6 from the second card cassette 3 to the first card cassette 2 and temporarily houses the card 6 every time the last card 6 housed in the first card cassette 2 is sent. The card handling apparatus 1 works as if the card 6 is housed in the first card cassette 2.

Figure 2:
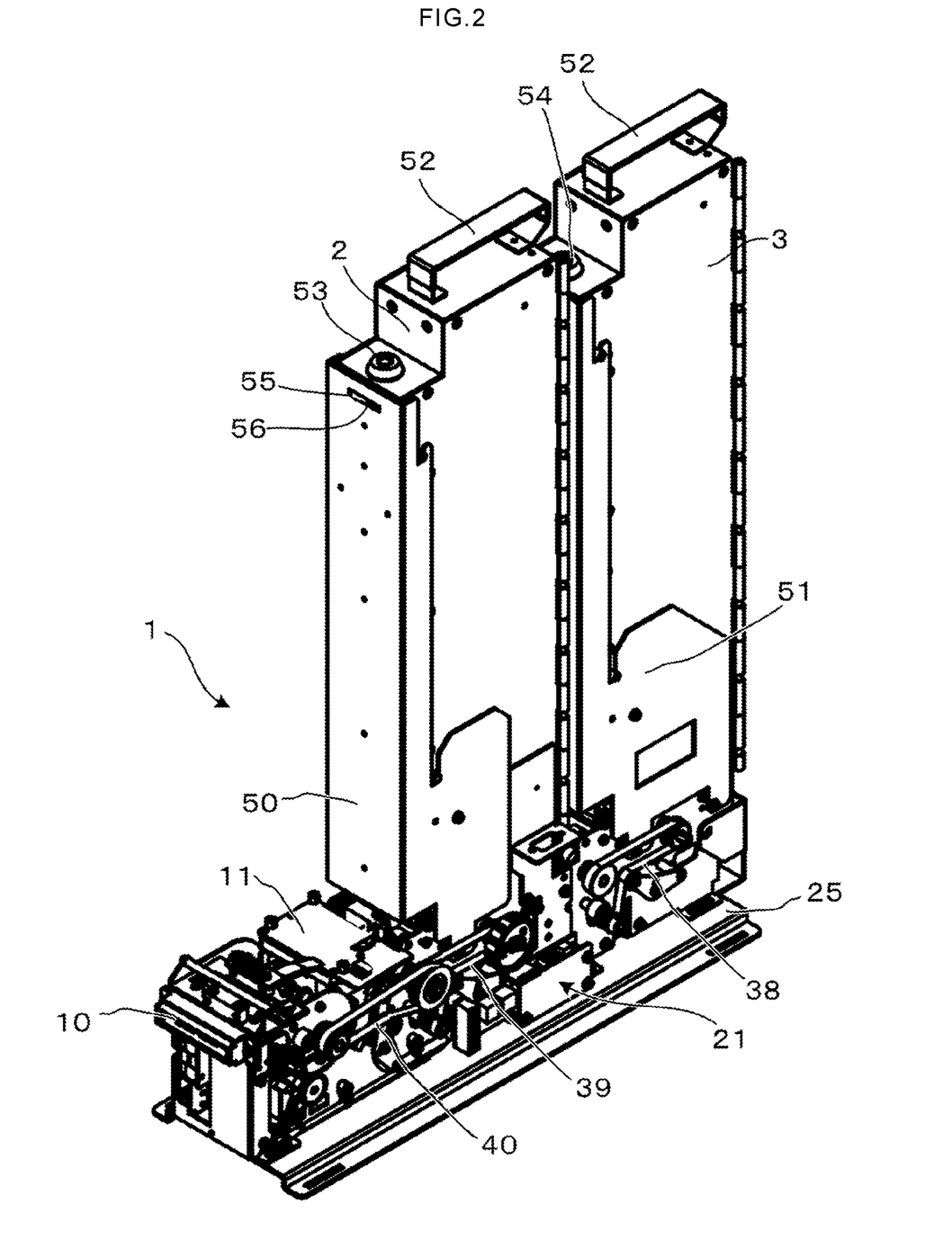
FIG. 2 is a perspective view of the card handling apparatus.

FIG. 2 is a perspective view of the card handling apparatus 1. FIG. 2 is the perspective view showing a state where the first card cassette 2 and the second card cassette 3 are attached to the conveying device 21.

The conveying device 21 is arranged on the frame 25. In the conveying device 21, a first support base 50 for attaching the first card cassette 2 and a second support base 51 for attaching the second card cassette 3 are arranged. The first card cassette 2 is attached to the first support base 50 and the second card cassette 3 is attached to the second support base 51. The first card cassette 2 can be detached from the first support base 50, and the second card cassette 3 can be detached from the second support base 51.

The first support base 50 is provided with a receiving seat 56 which is a through hole. The first card cassette 2 is provided with a first lock 53. A dead bolt 55 moves in conjunction with the operation of the first lock 53. When the first lock 53 is turned by a user's key in the state where the first card cassette 2 is attached to the first support base 50, the dead bolt 55 is inserted into the receiving seat 56. The first card cassette 2 is fixed to the first support base 50. The same mechanism is provided also in the second card cassette 3 and the second support base 51. The second card cassette 3 can be fixed to the second support base 51 by operating a second lock 54.

The first card cassette 2 and the second card cassette 3 are provided with handles 52, thereby making the cassettes easy to carry.

Figure 3:
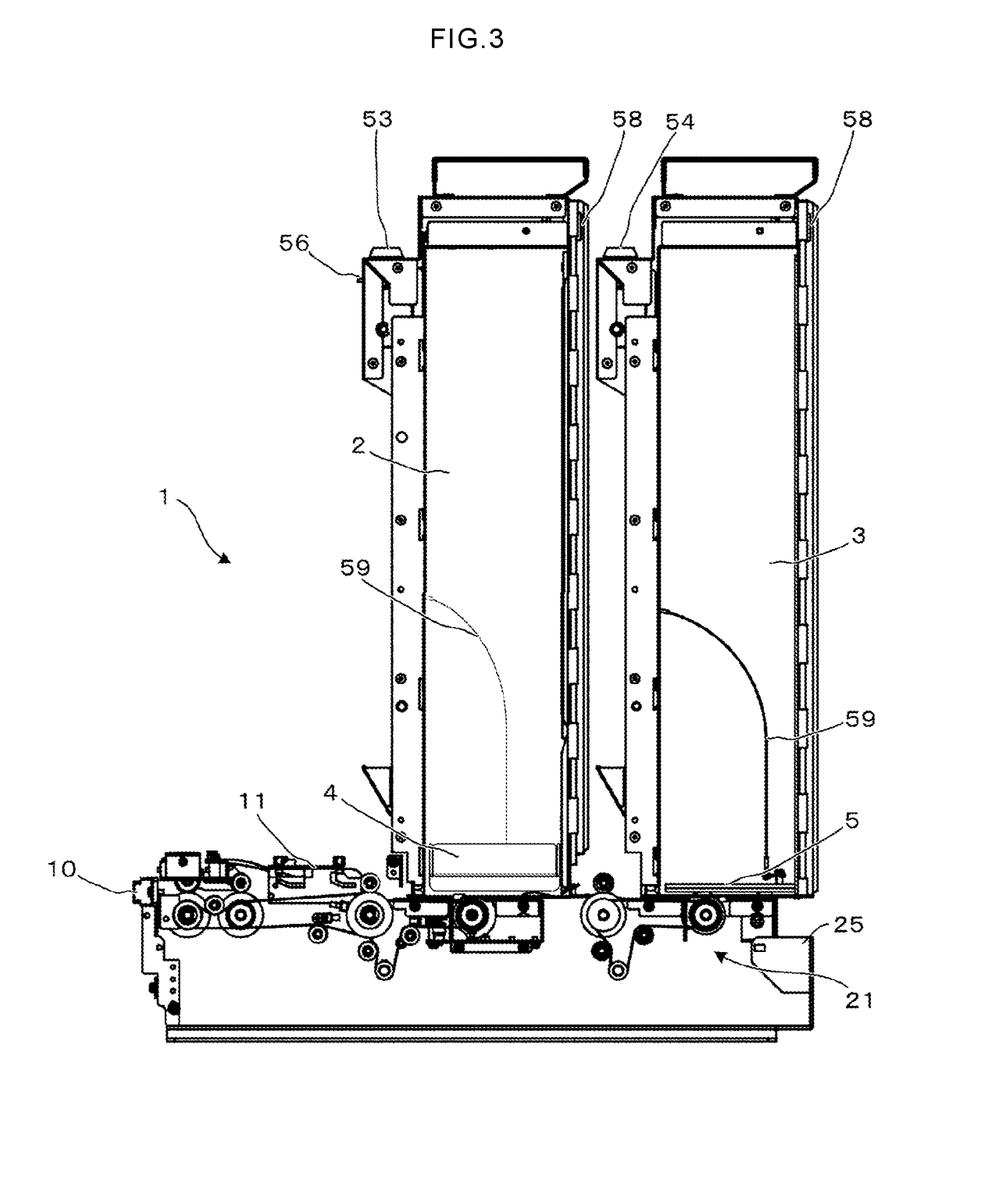
FIG. 3 is a side view for explaining an inner structure of the card handling apparatus.

FIG. 3 is a side view for explaining an inner structure of the card handling apparatus 1. FIG. 3 shows a state where side walls of the first card cassette 2 and the second card cassette 3 are removed to thereby see the inside. FIG. 3 also shows a state where the first support base 50, the second support base 51, and the like are removed.

In each of the first card cassette 2 and the second card cassette 3, one surface of the side surfaces, for example, a back surface is opened/closed to restock cards and can be locked by a storage lock 58.

The first weight 4 and the first card cassette 2 are connected by a connection wire 59. The second weight 5 and the second card cassette 3 are connected by a connection wire 59. Each connection wire 59 is connected so as to move inside each card cassette in a vertical direction. The first weight 4 used for the first card cassette 2 and the second weight 5 used for the second card cassette 3 have different shapes. As it is necessary that respective weights are associated with respective card cassettes, respective weights are connected by the connection wires 59. However, the connection wires 59 are not always necessary as long as respective weights can be housed in association with respective card cassettes.

Figure 4:
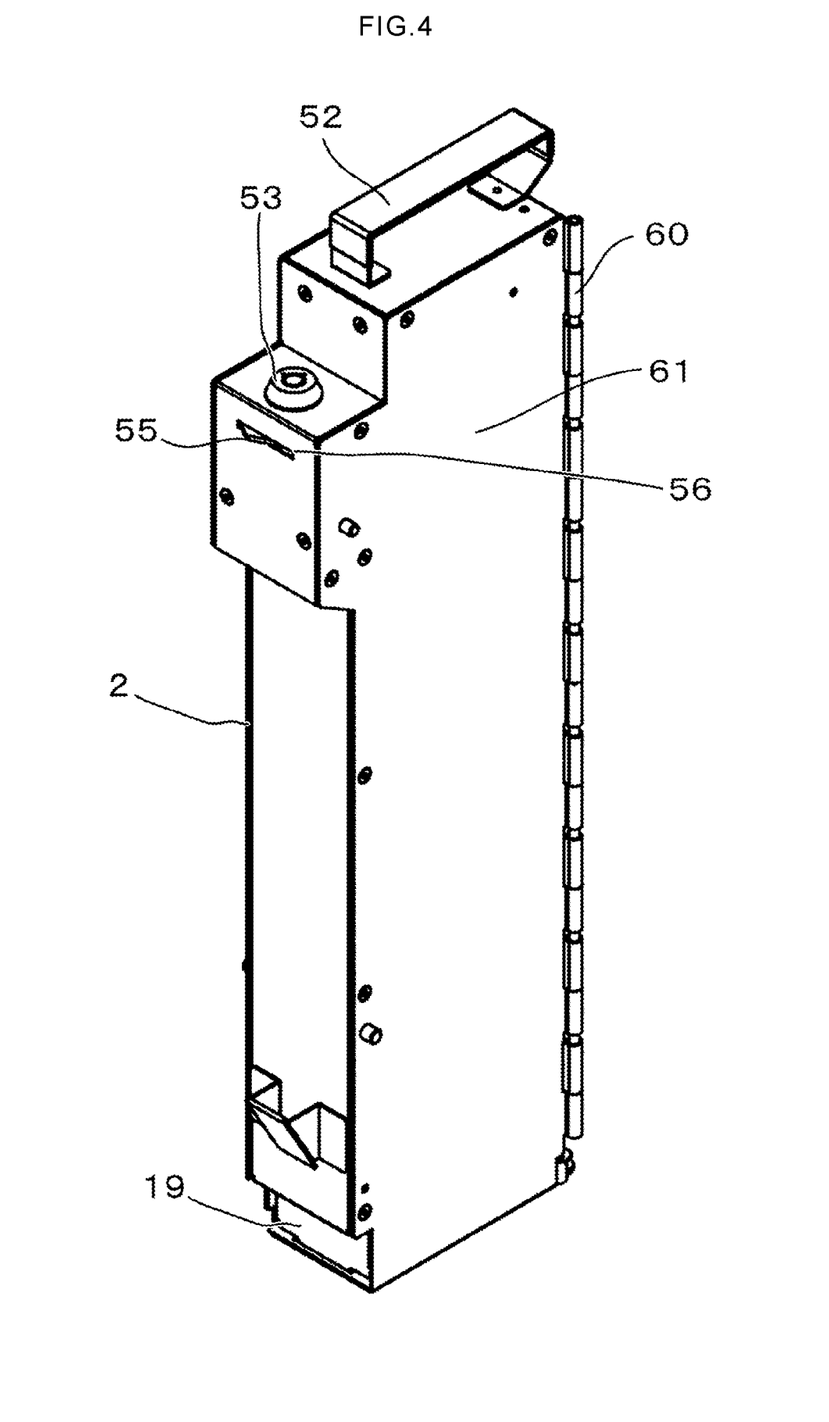
FIG. 4 is a perspective view for explaining an example of a card cassette.

FIG. 4 is a perspective view for explaining an example of the card cassette. The explanation will be made by using the first card cassette 2.

The second gate 19 for opening/closing the exit 8 (see FIG. 1) of the first card cassette 2 is disposed at a lower part on the front side of the first card cassette 2. The second gate 19 opens/closes in conjunction with the operation of the first lock 53. The first card cassette 2 is covered with a case 61 to prevent cards housed thereinside from being accessed. The back surface of the first card cassette 2 is connected by hinges so as to be opened/closed. A shaft cylinder 60 is disposed in the case 61 and a shaft is inserted therein, thereby supporting the back surface by the case 61 so as to be opened/closed. The back surface of the first card cassette 2 is opened, and cards can be restocked.

Figure 5:
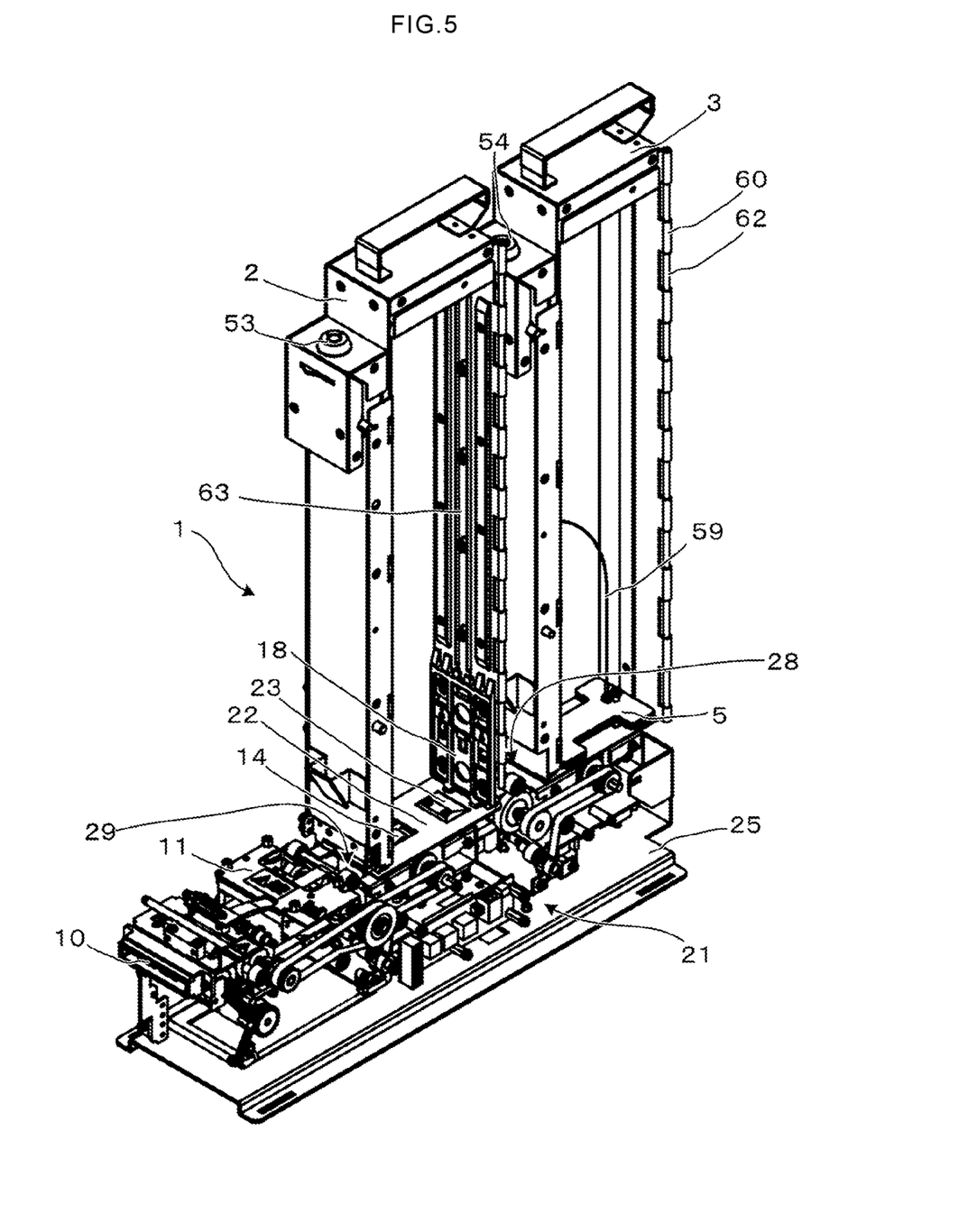
FIG. 5 is a perspective view for explaining the inside of the card cassette.

FIG. 5 is a perspective view for explaining the inside of the card cassettes. FIG. 5 is a view showing a state where side walls of the first card cassette 2 and the second card cassette 3 are removed to thereby see the inside.

The first gate 18 for opening/closing the entrance 7 (see FIG. 1) of the first card cassette 2 is arranged on the back surface side of the first card cassette 2. A link mechanism 63 is connected to the first lock 53. The link mechanism 63 operates in conjunction with the operation of the first lock 53 to thereby lock/unlock the first gate 18. A position of an end portion of the link mechanism 63 changes in accordance with the operation of the first lock 53. The movement of the first gate 18 is controlled in accordance with the position of the end portion of the link mechanism 63. For example, when the first lock 53 is operated to be in the locked position, the end portion of the link mechanism 63 abuts on the first gate 18 to restrict the movement of the first gate 18. When the first lock 53 is operated to be in the unlocked position, the end portion of the link mechanism 63 is separated from the first gate 18, and the first gate 18 can move in the vertical direction.

There is no gate on a back surface side of the second card cassette 3 and the back surface side is closed. The card is not conveyed to the second card cassette 3 from the outside. The shaft cylinder 60 is disposed on the back surface side of the second card cassette 3 and a shaft 62 is inserted therein. A back surface of the second card cassette 3 is connected by hinges so as to be opened/closed. The back surface of the second card cassette 3 is opened, and cards can be restocked.

The bottom surface on the inside of the first card cassette 2 forms the conveying surface 22. The first protrusion 23 is provided on the bottom surface on the inside of the first card cassette 2 in FIG. 5; however, the first protrusion 23 is not always necessary. FIG. 5 is a view showing a state where the first weight 4 is removed. The opening is provided at the portion corresponding to the first separation roller 14 on the bottom surface on the inside of the first card cassette 2. The opening is provided in the second card cassette 3 in the same manner; however, the opening is hidden by the second weight 5 in FIG. 5.

Figure 6:
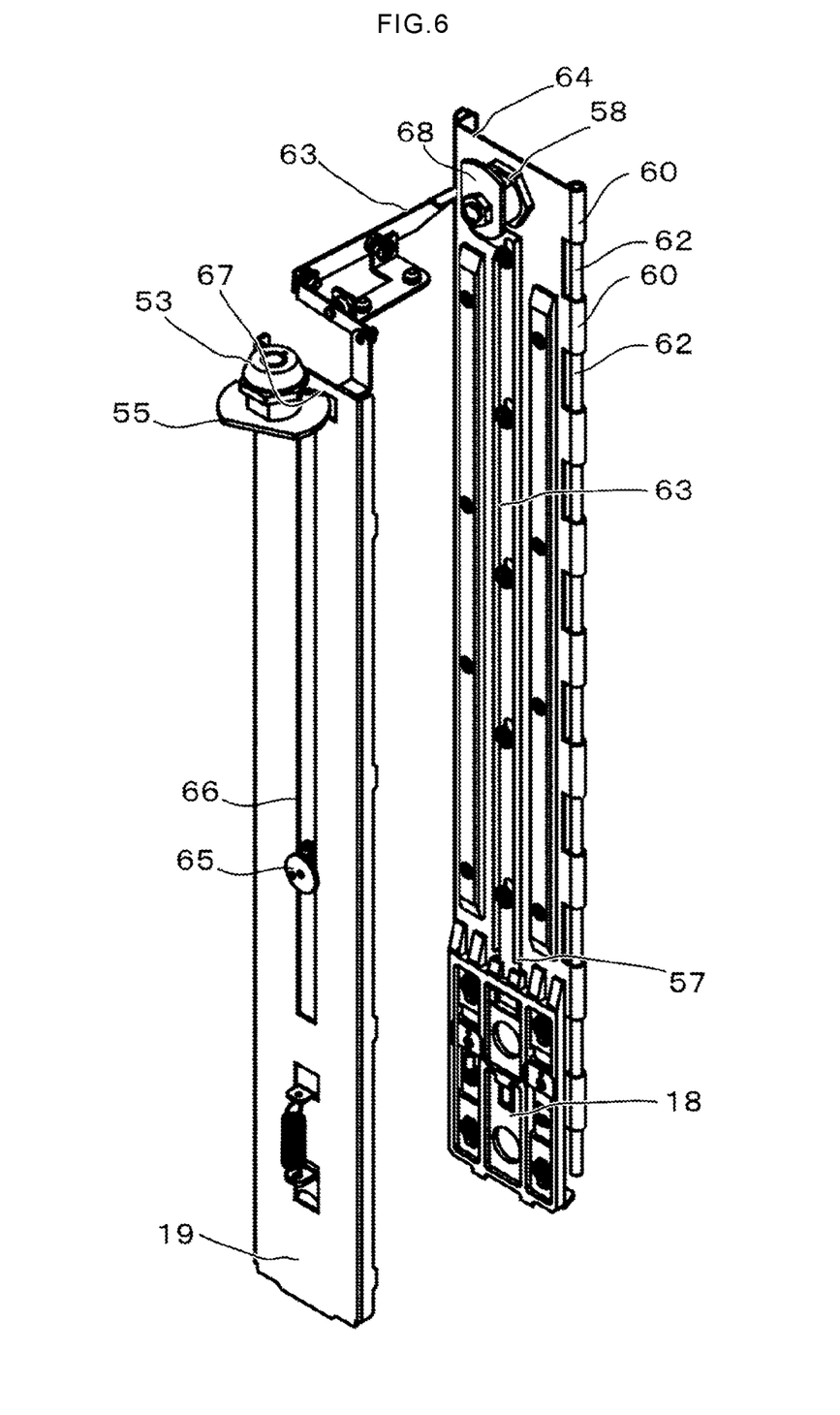
FIG. 6 is a view for explaining a lock mechanism of the card cassette.

FIG. 6 is a view for explaining the lock mechanism of the card cassette. FIG. 6 shows the lock mechanism inside the first card cassette 2.

The dead bolt 55 turns in conjunction with the operation of the first lock 53. When the dead bolt 55 is turned, the dead bolt 55 enters an abutting portion 67 having a through hole shape where the second gate 19 is provided, and abuts on a wall forming the through hole. An inclined portion inclining in a direction crossing the movement direction of the second gate 19 is provided in the abutting portion 67, and an abutting position between the dead bolt 55 and the inclined portion is changed in accordance with the turning of the dead bolt 55. The second gate 19 moves vertically in accordance with the abutting position.

The second gate 19 is provided with a fastening hole 66 along a longitudinal direction, and a fastener 65 is engaged so as to move along the fastening hole 66. One end of the connection wire 59 (see FIG. 3) is connected to the fastener 65. However, it is not always necessary that the weight is connected to the second gate 19. Accordingly, the fastening hole 66 and the fastener 65 are provided according to need.

The second gate 19 is connected to the link mechanism 63. The second gate 19 is closed and the first gate 18 is locked, or the second gate 19 is opened and the first gate 18 is unlocked in accordance with the operation of the first lock 53. When the first lock 53 is in the locked position, the second gate 19 is fixed at a lowered position. Moreover, a link mechanism abutting portion 57 which is an end portion of the link mechanism 63 is fixed at a lowered position. Vertical movement of the first gate 18 is restricted by the link mechanism abutting portion 57 fixed at the lowered position. That is, the first gate 18 is locked in a closed state. When the first lock 53 is in the unlocked position, the second gate 19 is fixed at an elevated position. In addition, the link mechanism abutting portion 57 which is the end portion of the link mechanism 63 is fixed at the elevated position. The first gate 18 is capable of moving in the vertical direction to the position of the elevated link mechanism abutting portion 57. That is, the first gate 18 can be opened/closed.

A storage lid 64 forms the back surface of the first card cassette 2 (see FIG. 4). The storage lid 64 is connected to the case 61 (see FIG. 4) by hinges including the shaft cylinder 60 and the shaft 62 so as to be opened/closed. The storage lock 58 can fix an interlocking dead bolt 68 to an engaged state with the case 61 (FIG. 4) and a released state therefrom. That is, the storage lock 58 can lock the cassette in a state where the storage lid 64 is closed.

Figure 7:
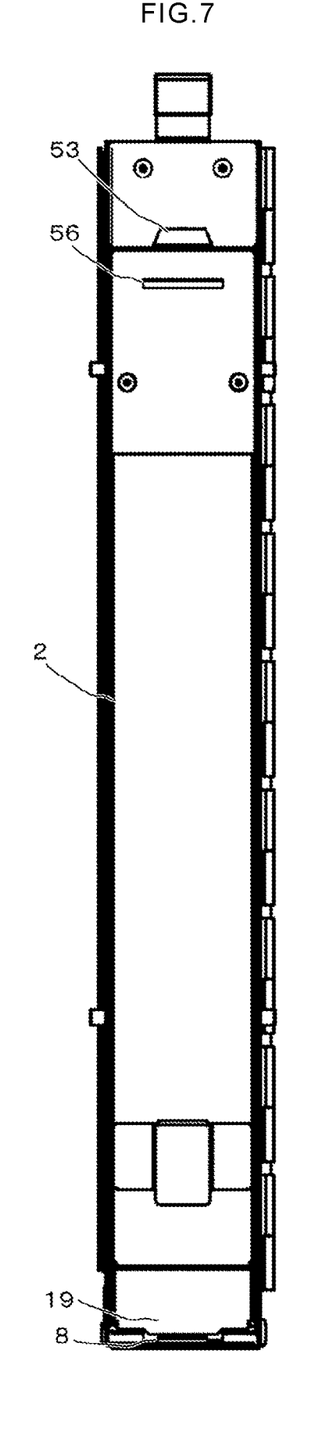
FIG. 7 is a front view showing a state where a gate of the card cassette is unlocked.
Figure 8:
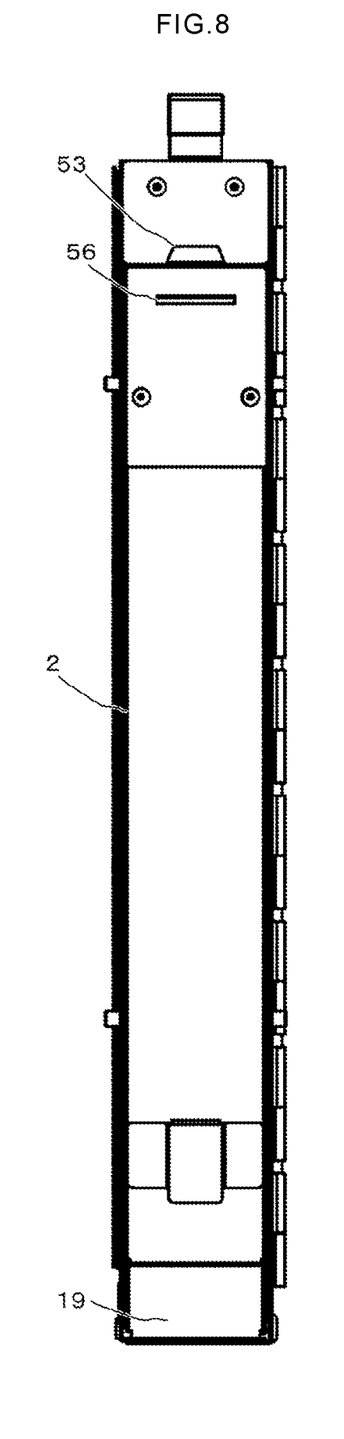
FIG. 8 is a front view showing a state where the gate of the card cassette is locked.
Figure 9:
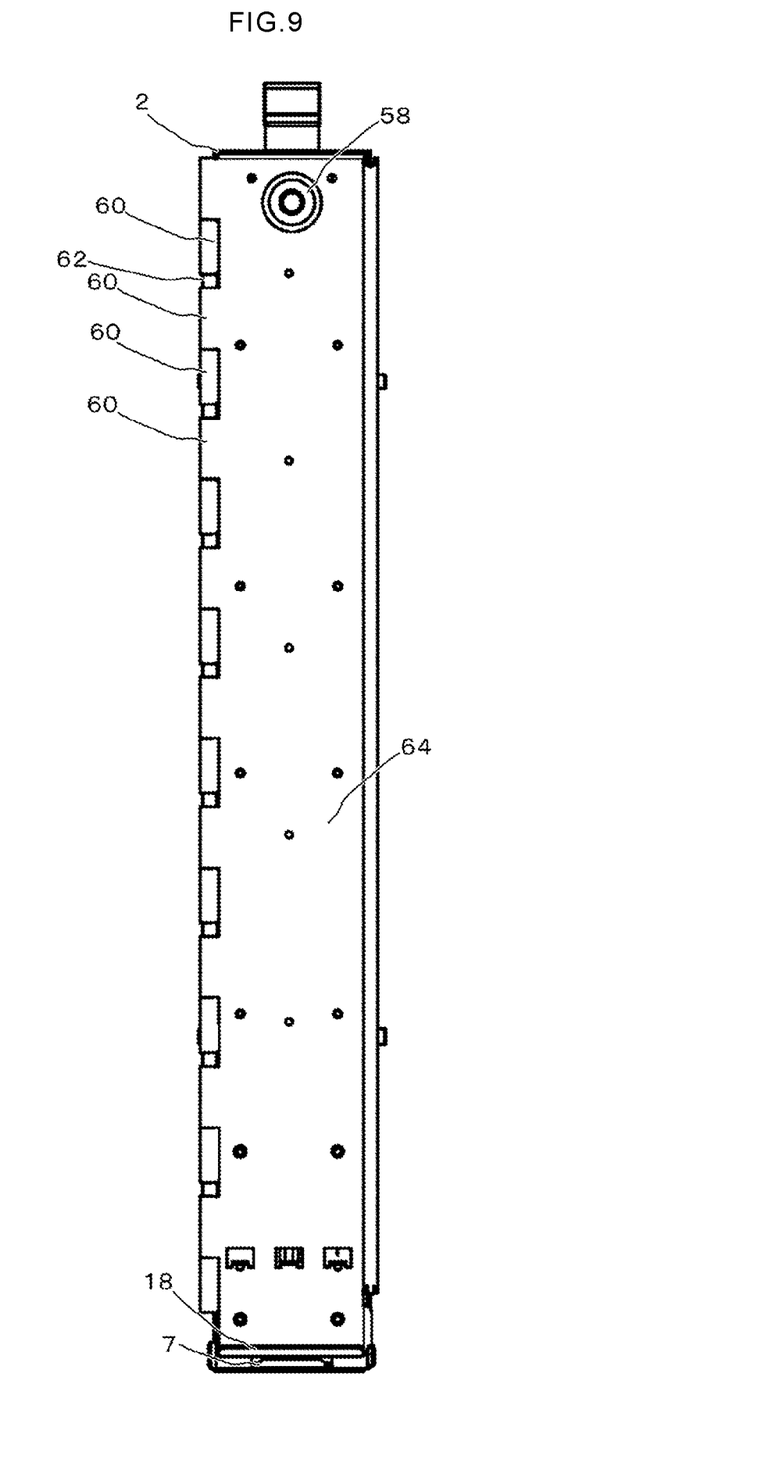
FIG. 9 is a back view showing the state where the gate of the card cassette is unlocked.
Figure 10:
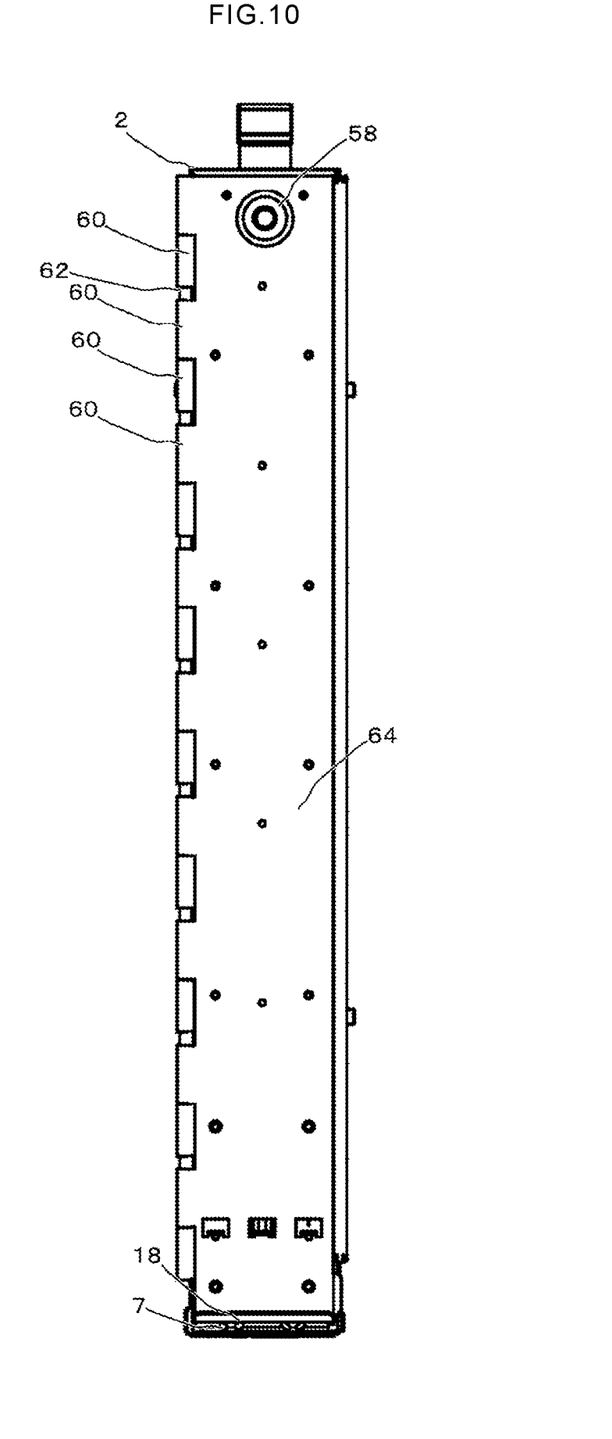
FIG. 10 is a back view showing the state where the state where the gate of the card cassette is locked.

FIG. 7 to FIG. 10 show states where the gate is opened or closed. FIG. 7 is a front view showing a state where the gate of the card cassette is unlocked. FIG. 8 is a front view showing a state where the gate of the card cassette is locked. FIG. 9 is a back view showing the state where the gate of the card cassette is unlocked. FIG. 10 is a back view showing the state where the state where the gate of the card cassette is locked.

FIG. 7 is a view of the first card cassette 2 seen from the front side. The second gate 19 at the lower part in the front of the first card cassette 2 is in an opened state and the exit 8 of the first card cassette 2 is opened. The card can be sent from the exit 8 of the first card cassette 2. FIG. 8 is a view of the first card cassette 2 seen from the front side. The second gate 19 at the lower part in the front of the first card cassette 2 is in a closed state and the exit 8 of the first card cassette 2 is blocked.

FIG. 9 is a view of the first card cassette 2 seen from the back surface side. The first gate 18 at the lower part in the back of the first card cassette 2 is in an unlocked state. The first gate 18 is capable of moving in the vertical direction, and the card can be inserted to the inside from the entrance 7 of the first card cassette 2. FIG. 10 is a view of the first card cassette 2 seen from the back surface side. The first gate 18 at the lower part in the back of the first card cassette 2 is in a locked state. The first gate 18 is not capable of moving in the vertical direction and the card is unable to be inserted to the inside from the entrance 7 of the first card cassette 2.

Figure 11:
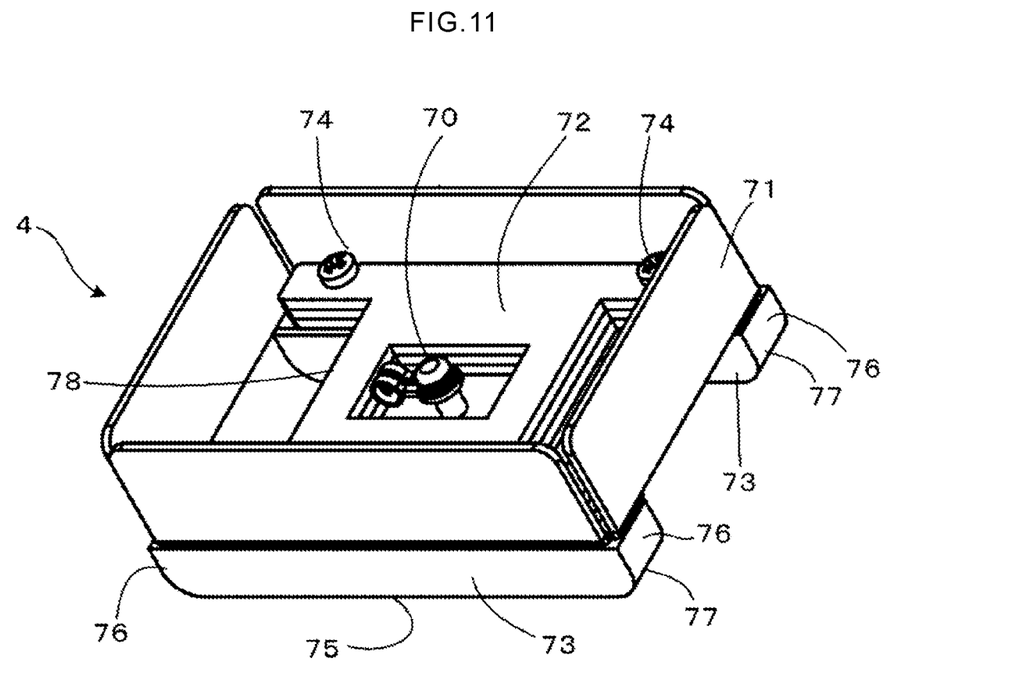
FIG. 11 is a perspective view showing a first example of a weight of the card cassette.

Next, the first weight 4 housed in the first card cassette 2 will be explained. FIG. 11 is a perspective view showing a first example of the weight of the card cassette.

Contact portions 73 with respect to the card are disposed along a longitudinal direction of the first weight 4, and a weight case 71 is fixed thereon. A plurality of weight portions 72 are stacked to be fixed inside the weight case 71 by screws 74. The weight of the first weight 4 can be changed by the number of weight portions 72. An opening is provided at approximately the center of the weight portions 72, and a fixing pin 70 is fixed to the weight case 71 inside the opening. The fixing pin 70 is an attachment part for connecting to the connection wire 59 (see FIG. 3); but the fixing pin 70 does not always have to be provided if connection is not necessary. A recessed portion 78 is formed at an end part in the longitudinal direction of the weight portions 72. The weight case 71 is provided with an opening at a position corresponding to the recessed portion 78. The opening is arranged at a portion in the first weight 4 corresponding to a detection position by the detection sensor so that the detection sensor for detecting the presence of the card does not wrongly detect the first weight 4. The contact portions 73 are also provided due to the same reason so as to avoid the detection position by the detection sensor for preventing reaction by the detection sensor.

The first card cassette 2 doubles as the conveying path for the card conveyed from the second card cassette 3. It is desirable that the card conveyed from the second card cassette 3 can pass between the conveying surface 22 (see FIG. 1) and the first weight 4 smoothly. Accordingly, curved portions 77 formed by curving end portions 76 are disposed at the end portions 76 so that the card can move in the direction of a contact surface 75 smoothly when the card abuts on the end portions 76 of the contact portions 73. The curved portions 77 may be inclined surfaces. Due to the presence of the curved portions 77, the end portions 76 are separated from the conveying surface 22 (see FIG. 1) to thereby form a structure in which the card easily enters between the contact portions 73 and the conveying surface 22 (see FIG. 1). It is preferable that, at least, the end portions 76 are separated from the conveying surface 22 (see FIG. 1) farther than a thickness of one card, and preferable that the end portions 76 are separated, for example, by 2 mm or more so that the card can be inserted between the contact portions 73 and the conveying surface 22. The end portions 76 may have rollers rotating in the conveying direction of the card instead of the curved portions 77.

Figure 12:
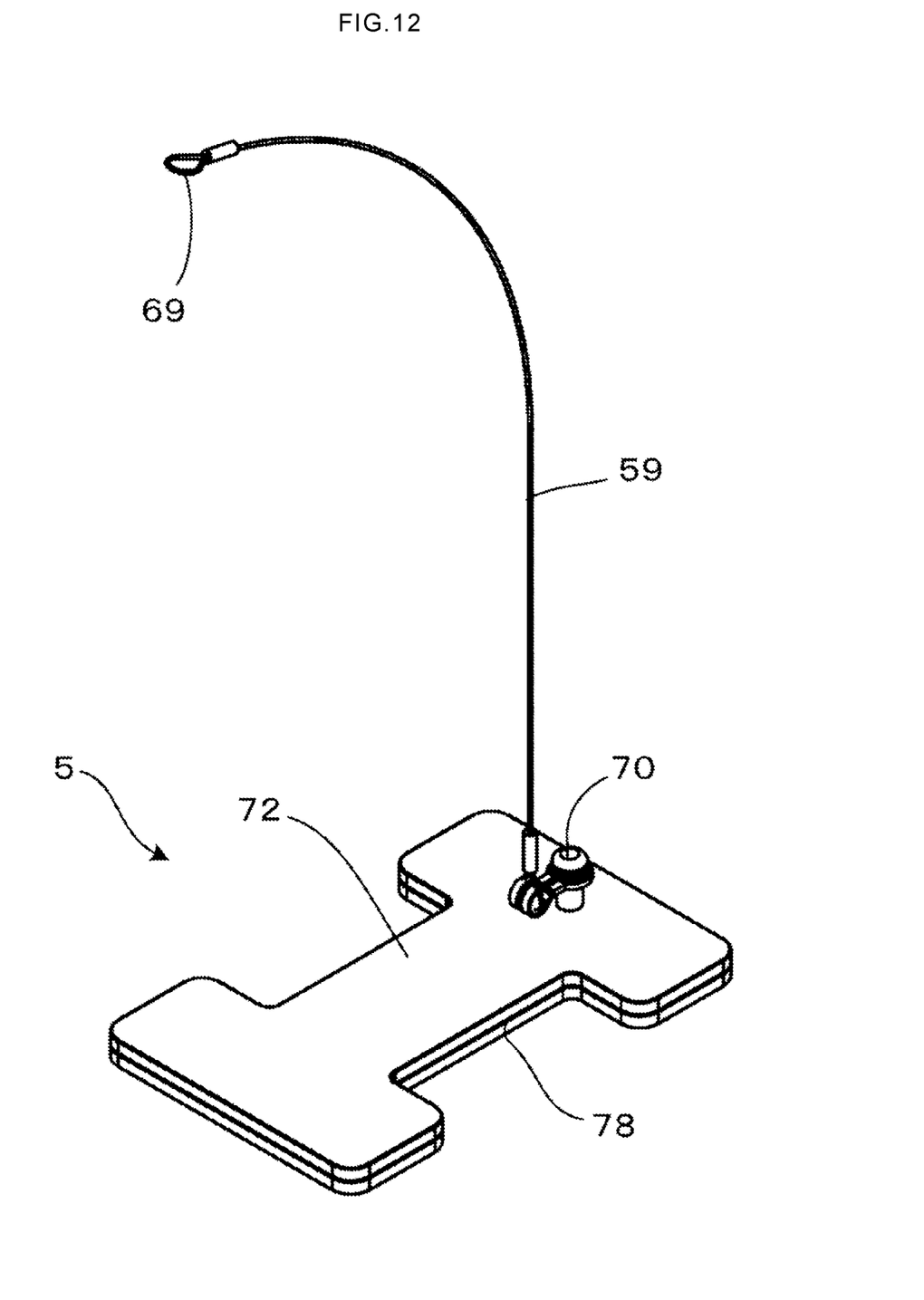
FIG. 12 is a perspective view showing a second example of the weight of the card cassette.

FIG. 12 is a perspective view showing a second example of the weight of the card cassette. FIG. 12 is the perspective view showing the second weight 5 housed in the second card cassette 3 (see FIG. 3). The curved portions 77 are not necessary for the second weight 5 to be housed in the second card cassette 3. Accordingly, flat weight portions 72 can be used as the weight. The weight of the second weight 5 can be adjusted by stacking a plurality of weight portions 72 to be fixed. The fixing pin 70 is fixed to one surface of the second weight 5. The fixing pin 70 is the attachment part for connecting the connection wire 59. A wire connecting portion 69 is connected to the second card cassette 3 (see FIG. 3). The second weight 5 may have the same structure as the first weight 4 (see FIG. 11).

The recessed portions 78 are formed along the longitudinal direction of the weight portions 72. The recessed portions 78 are arranged so as to avoid a detection range by the detection sensor for preventing the detection sensor from reacting when the card does not exist.

What is claimed is:

1. A card handling apparatus comprising:
a card cassette that houses cards;
a conveying device that separates one card at the lowest position from the cards housed in the card cassette and convey the card, which conveys the cards one by one,
wherein the card cassette includes a first card cassette and a second card cassette, and the first card cassette is disposed on the downstream side of the second card cassette in a conveying direction of the cards,
the first card cassette has a card entrance from which the card is put into the first card cassette on an upstream side in the conveying direction and a card exit from which the card is dispensed from the inside of the first card cassette on a downstream side in the conveying direction,
the second card cassette has a card exit from which the card is dispensed from the inside of the second card cassette on the downstream side in the conveying direction,
the card handling apparatus configured such that:
when the first card cassette houses the cards, the conveying device separates one card at the lowest position from the cards housed in the first card cassette and dispenses the card from the card exit of the first card cassette, and
when the first card cassette houses no card, the conveying device separates one card at the lowest position from the cards housed in the second card cassette, dispensing the card from the card exit of the second card cassette and putting the card into the first card cassette from the card entrance of the first card cassette to allow the card to pass inside the first card cassette and to be dispensed from the card exit of the first card cassette; and
a weight to be placed on the card at the highest position in the cards housed in the first card cassette,
wherein the card conveyed from the second card cassette to the first card cassette is conveyed between a conveying surface of the card and the weight.

2. The card handling apparatus according to claim 1, wherein an end portion of a surface of the weight contacting the card on the card entrance side of the first card cassette is separated at least by a thickness of the card or more from the conveying surface, and
the card entering from the card entrance of the first card cassette is conveyed so as to enter between the surface of the weight contacting the card and the conveying surface.

3. The card handling apparatus according to claim 2, wherein a height of an opening in the card exit of the first card cassette is equal to or more than a thickness of one card and lower than a thickness of two cards so that only one card is allowed to pass through, and the conveying device has a separation roller contacting a back side of the card housed in the first card cassette at the lowest position and moves the card in the conveying direction, a circumferential surface of the separation roller contacting the card has a drive area protruding from the conveying surface and a non-drive area not protruding from the conveying surface, and the card is conveyed in a state where the drive area contacts the card by turning the separation roller.

4. The card handling apparatus according to claim 2, wherein the conveying surface of the conveying device has a protrusion protruding from the conveying surface between the card entrance of the first card cassette and the separation roller so as to form a clearance between the card and the conveying surface.

5. The card handling apparatus according to claim 1, wherein the first card cassette includes a first gate opening and closing the card entrance of the first card cassette, a second gate opening and closing the card exit of the first card cassette, and a lock mechanism connected to the first gate and the second gate, and the lock mechanism fixes the gates in any of a case where the first gate is allowed to be opened/closed and the second gate is in an opened state and a case where the first gate is not allowed to be opened/closed and the second gate is in a closed state.

6. The card handling apparatus according to claim 2, wherein the conveying device has a card detection sensor detecting whether the card is housed inside the first card cassette or not, and the card detection sensor detects the presence of the card and detects whether the card is placed at a position where the card is movable by the separation roller or not.

7. The card handling apparatus according to claim 1, wherein the conveying device has a card detection sensor detecting whether the card is housed inside the first card cassette or not, and the card handling apparatus configured such that:

when the card detection sensor detects that the card is not housed in the first card cassette, one card is conveyed from the second card cassette to the first card cassette and one card is housed in the first card cassette.

\* \* \* \* \*